United States Patent Office 3,454,680
Patented July 8, 1969

3,454,680
PROCESS FOR THE POLYMERIZATION OF BUTA-
DIENE EMPLOYING A THREE COMPONENT
CATALYST PLUS A MOLECULAR WEIGHT
"JUMP" AGENT
Eitaro Okuya and Tokuo Ito, Yokkaichi-shi, Akio
Sakaguchi, Gifu-shi, and Koei Komatsu and Hidetoshi
Yasunaga, Yokkaichi-shi, Japan, assignors to Japan Syn-
thetic Rubber Co., Ltd., Tokyo, Japan, a corporation
of Japan
No Drawing. Filed Jan. 12, 1967, Ser. No. 608,750
Claims priority, application Japan, Jan. 22, 1966,
41/3,437
Int. Cl. C08d 1/14, 3/08
U.S. Cl. 260—94.3        13 Claims

ABSTRACT OF THE DISCLOSURE

Mooney viscosity jump of polybutadiene. Butadiene is polymerized in solution and in the presence of Ni containing catalyst system, such as nickel naphthenate/boron trifluoride etherate/triethylaluminum, until a predetermined conversion is achieved. Jump agents, e.g. triethylaluminum, is then added. Suitable jump agents are halogen-free organometallic compounds of the metals of Groups I, II and III, such as trialkylaluminum, dialkylaluminum hydride, dialkylaluminum alkoxide, dialkylzinc and alkyllithium, Ni-containing catalysts are known and disclosed in the British patent specification Nos. 905,099 and 906,334.

---

This invention relates to a process for polymerizing butadiene, in particular to a process for the solution polymerization of butadiene for obtaining cis-polybutadiene having a high Mooney viscosity while keeping the viscosity of the polymerization solution low upon carrying out the polymerization.

In recent years a process for preparing polybutadiene having a high content of cis-1,4 configuration, namely, cis-polybutadiene has been broadly studied and because cis-polybutadiene has excellent properties such as low heat build-up, high abrasion resistance and good low temperature properties, it has been broadly used in industries as general purpose rubber.

Normally, cis-polybutadiene is prepared by polymerizing butadiene in a good solvent such as toluene and benzene, at this time, as the polymerization reaction proceeds, concentration of the polymer increases, viscosity of the reaction mixture remarkably rises and stirring and removal of the generated reaction heat become difficult. Because of that, in spite of the fact that the higher the ratio of a monomer to a solvent is, the more economically advantageous the reaction becomes, practically, concentration of the charged monomer is compelled to be kept at 10 to 15 percent at most. When the concentration is made higher, the reaction has to be stopped at a low conversion. Also the solution viscosity of the polymerization system greatly depends upon molecular weight of the polymer aside from concentration thereof, the solution viscosity rising rapidly as the molecular weight increases. Accordingly, from the economical and operational viewpoint it is preferable to keep the molecular weight of the polymer produced low.

On the other hand, in order to maintain physical or mechanical properties of vulcanized rubber above the desired value in accordance with the objective use, the unvulcanized rubber must maintain a Mooney viscosity value above a predetermined value corresponding thereto. Between a Mooney viscosity and a molecular weight, there exists generally a relationship that the larger the molecular weight becomes, the higher the Mooney viscosity rise. Therefore, there is a limit in keeping the molecular weight of the polymer low.

If it is possible to raise a Mooney viscosity of the polymer by one means or another at a stage where the polymerization reaction reaches the desired final conversion, it will become possible to make a process of the polymerization reaction proceed at a lower solution viscosity to the final conversion. Namely, it becomes possible to proceed the polymerization reaction to the final conversion with a higher concentration of the monomer while making the molecular weight lower and keeping the solution viscosity lower. Accordingly, it is apparent that a great technical and economical advantage is brought about.

One answer to this tack is given in Rubber Age, pages 410–415, December 1964. The article teaches that a polymer having a high Mooney viscosity is obtained when butadiene is subjected to polymerization conditions in a solution in the presence of a catalyst system consisting of a cobalt compound and an alkyl aluminum halide, and when a predetermined conversion is achieved, a Friedel-Crafts catalyst (e.g. alkyl aluminum halides) or a combination of a Friedel-Crafts catalyst and a suitable co-catalyst (e.g. compounds with active hydrogen such as water, an alcohol or an acid; or organic or inorganic acid halides) is added to the polymerization system. This phenomenon is referred to as "molecular weight jump reaction."

The present inventors have confirmed that a Friedel-Crafts catalyst is effective for molecular weight jump of polybutadiene obtained by using as catalyst a titanium tetrachloride/iodine/triethyl aluminum system. However, a Friedel-Crafts catalyst or combination theerof with a co-catalyst is not effective for Mooney viscosity jump of polybutadiene obtained by using a nickel compound-containing catalyst system disclosed in British Patents 905,099 and 906,334.

It has been unexpectedly found that for Mooney viscosity jump of polybutadiene obtained by useing the nickel compound-containing catalyst system described in said British patents, an organometallic compound of a metal of Groups I, II and III of the Periodic Table having in its molecule at least one metal-carbon bond and not containing a halogen atom is suitable. This discovery is further surprising when the fact that these organometallic compounds, not containing halogen atoms, are ineffective for Mooney viscosity jump of polybutadiene obtained by using a catalyst system consisting of a cobalt compound and an alkyl aluminum halide or a catalyst system consisting of titanium tetrachloride, iodine and triethylaluminum is taken into consideration.

The present invention provides a process for polymerizing butadiene wherein butadiene is polymerized in a hydrocarbon solvent and converted to a solid polymer having a high content of cis-1,4 configuration by contacting butadiene with a catalyst system prepared from (A) an organic compound of nickel, (B) at least one compound selected from halides and oxyhalides of metals of Groups IV–A and V–A of the Periodic Table, boron halides and complex compounds thereof, and (C) at least one compound selected from organometallic compounds of metals of Groups I, II and III of the Periodic Table, characterized in that when the polymerization proceeds to a predetermined conversion, at least one compound having in its molecule at least one metal-carbon bond and not containing a halogen atom, said compound being selected from organometallic compounds of metals of Groups I, II and III of the Periodic Table is added to the polymerization system.

A group of said organometallic compounds each having in its molecule at least one metal-carbon bond and not containing a halogen atom suitable for use in the process of this invention (hereinafter shall be referred to as Mooney viscosity jump agent) may be represented by the following formula.

$$Me(Me')_l(R)_n(R')_m \quad (1)$$

wherein Me and Me' are metals of Groups I, II, and III of the Periodic Table, respectively; R is a hydrocarbyl group having 1 to 8 carbon atoms and may be alkyl, cycloalkyl, aryl, aralkyl or alkenyl; R' is hydrogen or an alkoxy group having 1 to 8 carbon atoms; $l$ is an integer of 0 to 1; $n$ is an integer of 1 to 6, $m$ is an integer of 0 to 5, and $n+m$ equals to the total of valencies of metals Me and Me'. Preferable Mooney viscosity jump agents are organometallic compounds of those metals such as lithium, sodium, beryllium, magnesium, zinc, cadmium, mercury, boron and aluminium. As examples of preferable Mooney viscosity jump agents represented by said Formula 1, there are isoamylsodium, cyclopentadienylsodium, isopropenyllithium, n-butyllithium, sec-butyllithium, tert.- butyllithium, phenyllithium, diethylzinc, methylzinc, methoxide, methylzinc hydride, triethylsodium zinc, tetramethyldilithiozinc etherate, diethylcadmium, diphenylcadmium, diethylmagnesium, diethylmagnesium etherate, di(cyclopentadienyl)magnesium, diethylberyllium, diethylcalcium, dimethylmercury, divinylmercury, triethyl aluminium, diethylaluminium hydride, triisobutylaluminium, diisobutylaluminium hydride, triphenylaluminium, diethylaluminium ethoxide, ethylaluminium diethoxide, trimethylaluminium etherate, tricyclooctyl lithium aluminium hydride, tetraethyl lithium aluminium, tetraethyl sodium aluminium, triethylboron and methyl divinylboron, of which trialkylaluminium compounds such as triethylaluminium, dialkylaluminium hydrides such as diisobutylaluminium hydride, dialkylaluminium alkoxides such as diethylaluminium ethoxide, dialkylzinc compounds such as diethylzinc and alkyllithium compounds such as n-butyllithium are especially preferable.

As another group of organometallic compounds suitable for use in this invention as Mooney viscosity jump agents, there is an alkylene dilithium wherein the alkylene residue has 1 to 8 carbon atoms such as methylene dilithium.

When an organometallic compound including halogen atom such as, for instance, diethylaluminium chloride is used Mooney viscosity hardly rises and when ethylaluminium dichloride is used, a gel is brought about. Therefore these compounds are unsuitable.

Upon practising this invention, butadiene is polymerized in a hydrocarbon solvent in the presence of a catalyst system prepared from each component of said (A), (B) and (C) to a predetermined conversion. At this time, it is advantageous to polymerize butadiene to a conversion of at least 70 percent, preferably at least 80 percent. And if desired it is possible to carry out this polymerization advantageously under conditions of maintaining the polymerization system at a relatively low solution viscosity. When the polymerization of butadiene proceeds to a desired conversion said Mooney viscosity jump agent is added to the polymerization system and uniformly distributed in the system before the polymerization catalyst is inactivated. Next, the reaction mixture is aged with stirring at a temperature within the range of from —20° C. to 150° C., preferably from 0° C. to 80° C. for appropriate period of time preferably for from 5 minutes to 10 hours. In this case, the heat generation of the aging reaction is very small and removal of the generated heat is hardly necessary. Next, into the aged reaction mixture is added an antioxidant and a short stop whereby the catalyst is inactivated. Further, if necessary, some compounding agents such as mineral oil, etc. may be added to the reaction mixture, followed by removal of the solvent from the polymer solution, and the obtained polymer is washed and dried to obtain the objective cis-polybutadiene.

Degree in the rise of the Mooney viscosity differs depending upon kind and amount of Mooney viscosity jump agent added and upon an aging period and temperature. Generally, however, the greater the amount of Mooney viscosity jump agent and the longer the aging period, the greater is the effect.

The amount of a Mooney viscosity jump agent to be added to the polymerization system is normally from 1 to 400 mols per 1 gram atom of nickel of said component (A) of the catalyst.

When a Mooney viscosity jump agent is added to the polymerization system and the system is uniformly mixed, polymerization of butadiene substantially stops at that stage, and conversion of butadiene does not appear to increase thereafter.

A catalyst system prepared from said components (A), (B) and (C) and a process for obtaining polybutadiene having a high cis content by contacting said catalyst system with butadiene in a hydrocarbon solvent are already known and disclosed in, for instance, British Patents 905,099 and 906,334 as well as Japanese Patent Publications Nos. 17996/1961, 22300/1961, 8193/1962 and 4197/1963.

The organonickel compounds (A) which are suitably used in this invention may be nickel carboxylates or organic complex compounds of nickel. The nickel carboxylates include formate, acetate, octate, octenate, palmitate, stearate, benzoate, ethyl benzoate, oxalate, succinate, sebacate, phthalate, naphthenate, rosinate and the like. Convenient organonickel complexes are those having carbon, nitrogen and/or oxygen atoms directly attached to the metal in the molecule, for example, carbonyl complexes such as nickel tetracarbonyl, hydroxyester complexes such as ethyl acetoacetate-nickel and derivatives thereof; hydroxyaldehyde complexes such as salicylaldehyde-nickel, salicylaldoxime-nickel and salicylaldehydeimine-nickel; hydroxyketone complexes such as acetylacetone-nickel; alphabenzoinoxime-nickel, o-hydroxyacetophenone-nickel, bis(1 - hydroxyanthone) nickel, nickel piromeconicate and bis-(tropolono) nickel; isonitrile complexes such as tetraphenylisonitrile - nickel; dihydroxynickel complex; hydroxyquinone complexes such as bis(1-hydroxyanthraquinone) nickel; diketodioximo complexes such as bis-(dimethylglyoximo) nickel and bis-(alpha-furildioximo) nickel; hydroxybenzylamine complex; hydroxyazo complex; 1-hydroxyacridine complex; hydroxybenzoquinoline complex; nitrosonaphthol complex; amino acid complex, anthranyl complex; dithizone complex; bis(salicylaldehyde) ethylenediimine complex; amine complexes such as tris(ethylenediamine) nickel sulfate; and other complex compounds of nickel having mono- to hexa-dentate structures similar to those compounds. The present inventors prefer to use an organo-nickel compound selected from nickel naphthenate, nickel octenate, nickel palmitate, nickel stearate, nickel benzoate, nickel tetracarbonyl, acetoacetate nickel, salicylaldehyde-nickel, salicyclaldehydeimine-nickel and a acetylacetone-nickel.

Said component (B) of the catalyst may be a boron halide such as boron trifluoride and boron trichloride or an organic complex compound thereof. When considered from the viewpoint of their ready availability, the etherates are most convenient, but other complexes such as complexes of boron trifluoride with either methanol, ethanol, phenol, acetic acide or ethyl formate can also be used. Besides these boron compounds, the component (B) of the catalyst usable in this invention may also be halides or oxyhalides of metals of Groups IV–A and V–A of the Periodic Table such as titanium tetrachloride, titanium tetrafluoride, titanium tetrabromide, butoxy titanium tetrachloride and vanadium oxychloride.

The organometallic compounds used as said component (C) of the catalyst include organoaluminium compounds of the formula:

$$AlR_{3-p}X_p$$

wherein R is a monovalent hydrocarbyl group having less than nine carbon atoms, X is a halogen selected from fluorine, chlorine and bromine and $p$ is either 0 or an integer 1 or 2. Examples of suitable organoaluminium compounds include triethylaluminium, triisobutylaluminium bromide and triphenylaluminium. Of these, trialkylaluminium is preferred. Besides these aluminium compounds, the component (C) of the catalyst may also be organometallic compounds such as n-butyllithium, diethylcadmium, diethylzinc, diethylmagnesium, and tributylboron.

The ratio of each of said components (A), (B) and (C) may normally be about 4 to 320 mols of the component (B) and about 4 to 80 mols of the component (C) based on 1 gram atom of nickel of the component (A).

The polymerization catalyst may be prepared by mixing said three catalyst components in a suitable hydrocarbon solvent (may be same as that used in the polymerization). The catalyst may also be prepared by mixing the three catalyst components in the presence of a small amount of a conjugated diolefin (e.g. butadiene). In this case, it is generally advantageous to make somewhat larger the amount of the components (B) and (C) based on the component (A); however, when an alkylaluminium hydride such as diisobutylaluminium hydride is used as Mooney viscosity jump agent, the amounts of the components (B) and (C) based on the component (A) may be small and normally it is better to use about 4 to 500 mols of the component (B) and about 4 to 100 mols of the component (C) and about 5 to 500 mols of the conjugated diolefin based on 1 gram atom of nickel of the component (A).

Suitable solvents used for the polymerization system include aromatic hydrocarbons, aliphatic hydrocarbons and alicyclic hydrocarbons which are liquid at room temperature, such as benzene, toluene, xylene, pentane, hexane, heptane, octane, nonane, decane, cyclohexane and cycloheptane. They may also be used as a mixture of at least two.

The catalyst system may be used normally in an amount of about 0.001 to 10, preferably 0.01 to 1 milligram atom of nickel based on the component (A) per 1 mol of butadiene. The polymerization reaction is carried out at a temperature within the range of from about −30° C. to about +150° C, preferably 20° C. to 100° C. for appropriate period of time, usually 30 minutes to 8 hours under a pressure sufficient to maintain the reaction system in liquid phase and under an inert gas atmosphere.

Unvulcanized cis-polybutadiene has usually a large cold flow tendency and has difficulties in its packaging, transportation and storage. Generally the higher is a Mooney viscosity of a polymer, the lower is its cold flow tendency. When the product of this invention what has a higher Mooney viscosity has a lower cold flow tendency. However, it has been found that products having high Mooney viscosities obtained by using as Mooney viscosity jump agent particular organometallic compounds such as triethylaluminium, diethylaluminium ethoxide, butyllithium and diethylzinc have lower cold flow tendency than the degree expectable from the degree of increase of Mooney viscosities.

Also it has been found that the Mooney viscosity jump reaction of the present invention does not adversely affect the content of cis-1,4 configuration of polybutadiene and is not accompanied by formation of a substantial amount of gel.

The following examples are given to illustrate the invention more specifically, but these examples are not to be construed as limiting the invention.

In examples microstructure of cis-polybutadiene was measured by D. Morero's infrared absorption spectrum analysis [Chim. e. Ind., 41, 758 (1959)].

The intrinsic viscosity $[\eta]$ was measured in toluene at 30° C. by using a Ubbelohde's viscometer.

The Mooney viscosity was measured at 105° C. by a Goodrich Mooney viscometer.

The cold flow was measured by extruding a polymer under a pressure of 3.5 lb./in.$^2$ at 50° C. through a ¼ inch orifice. In order to make the flow into a constant condition, the polymer was left to stand for 10 minutes, thereafter, the extruding speed was measured and the measured values were shown by milligram per minute (mg./min.).

The gel content was determined by adding 1.00 g. of the thinly sliced polymer to 100 milliliters (ml.) of toluene, stirring the mixture occasionally and 48 hours after, filtering the mixture by a 100 mesh stainless steel screen, and drying and measuring the undissolved part remained on the screen.

EXAMPLE 1

According to the following polymerization recipe, butadiene was polymerized.

Polymerization recipe:
  1,3-butadaiene (gram) _____ 30
  Toluene (ml.) _____ 200
  Nickel naphthenate (mg.-atom Ni) _____ 0.12
  Boron trifluoride etherate (mmol) _____ 0.89
  Triethylaluminum (mmol) _____ 0.80
  Reaction temperature (° C.) _____ 40
  Reaction period (hour) _____ 2.5

Into a 300 ml. pressure-resistant glass reaction bottle, whose inner atmosphere had been replaced by dry nitrogen gas, there were charged 50 ml. of dry toluene, nickel naphthenate and boron trifluoride etherate. The resulting mixture was left to stand at 25° C. for 10 minutes. Then triethylaluminium was added thereto and the resulting mixture was again left to stand at 25° C. for 10 minutes. And then there were added 150 ml. of dry toluene and butadiene into the reaction bottle. The reaction bottle was placed in a rotary polymerization bath whose temperature was adjusted to 40° C. and the polymerization was carried out while rotating the reaction bottle. After 2.5 hours, the reaction bottle was taken out and triethylaluminium in amounts shown in Table 1 dissolved in 10 ml. of dry toluene was added as a Mooney viscosity jump agent. The bottle was well shaken and the reaction bottle was rotated in the rotary polymerization bath at 40° C. for 1.5 hours. Next, the produced polymer was precipitated by pouring the reaction mixture into an excess amount of isopropyl alcohol containing 0.2 percent 2,6-di-t-butyl-4-methylphenol (antioxidant). The precipitated polymer was washed in a mixer with a large amount of isopropyl alcohol and dried on open roll at 110° C. for 4 minutes. The Mooney viscosity, intrinsic viscosity, cold flow, gel content and cis-1,4 configuration contents of the obtained polybutadienes were measured. The results are shown in Table 1.

TABLE 1

| Exp. No. | Al (C$_2$H$_5$)$_3$, (mmol) | Conversion, percent | Mooney viscosity | $[\eta]$ | Cold flow, mg./min. | Gel, percent | Cis-1,4, percent |
|---|---|---|---|---|---|---|---|
| 1 | 0 | 87 | 48.0 | 3.2 | 3.4 | 0 | 96 |
| 2 | 1.6 | 77 | 50.0 | 3.1 | 1.3 | 0 | 96 |
| 3 | 2.4 | 77 | 50.5 | 3.2 | 1.1 | 0 | 96 |
| 4 | 4.0 | 75 | 58.0 | 3.3 | 0.7 | 1.6 | 96 |
| 5 | 6.4 | 81 | 62.0 | 3.2 | 0.6 | 2.0 | 96 |

EXAMPLE 2

Butadiene was polymerized with the same method as in Example 1 except that 0.033 mg.-atom Ni of nickel naphthenate, 1.95 mols of boron trifluoride etherate and 0.088 mmol of triethylaluminium were used and triethylaluminium in amounts shown in Table 2 at a later stage of polymerization were added as a Mooney viscosity jump agent. The results are shown in Table 2.

TABLE 2

| Exp. No. | Al(C$_2$H$_5$)$_3$, mmol | Conversion, percent | Mooney viscosity | [$\eta$] | Cold flow, mg./min. | Gel, percent | Cis-1,4, percent |
|---|---|---|---|---|---|---|---|
| 6 | 0 | 87 | 46.5 | 2.9 | 4.2 | 0 | 96 |
| 7 | 0.44 | 80 | 49.5 | 3.0 | 2.9 | 0 | 96 |
| 8 | 0.88 | 78 | 56.5 | 3.1 | 1.9 | 0 | 96 |
| 9 | 1.32 | 66 | 76.5 | 3.2 | 0.7 | 0.9 | 96 |

From the results of Examples 1 and 2, it will be understood that by adding triethylaluminium at the final stage of polymerization reaction, Mooney viscosity rises and cold flow tendency is remarkably reduced. And it will also be apparent that by addition of triethylaluminium, cis-1,4 configuration content of the polymer does not change.

EXAMPLE 3

In this example, it will be shown that if triethylaluminium is added when the polymerization reaction does not sufficiently proceed, namely at a low conversion, the polymerization reaction does not proceed thereafter, accordnigly; in general addition of a Mooney viscosity jump agent should be carried out when the polymerization reaction reaches a predetermined conversion.

The polymerization reaction was carried out with the same method as in Example 1 except that 1.5 gm.-atom Ni of nickel naphthenate, 1.11 mmols of boron trifluoride etherate and 1.00 mmol of triethylaluminium were used, and that 2.00 mmols of triethylaluminium were added after lapse of different times from the initiation of the polymerization and the total of the reaction periods before and after the addition was made 3 hours. The results are shown in Table 3 together with the result of an experiment wherein the polymerization reaction was carried out for 3 hours without adding triethylaluminium.

TABLE 3

| Exp. No.: | Time at which Al(C$_2$H$_5$)$_3$ was added after initiation of the reaction | Conversion, percent | [$\eta$] | Cold flow, mg./min. |
|---|---|---|---|---|
| 10 | (¹) | 95.8 | 2.8 | 2.5 |
| 11 | 0.5 | 20.4 | | |
| 12 | 1.0 | 71.1 | 2.8 | 2.7 |
| 13 | 1.5 | 74.8 | 2.9 | 2.1 |
| 14 | 2.5 | 93.4 | 2.6 | 1.2 |

¹ [Al$_2$(C$_2$H$_5$)$_3$ not added].

EXAMPLE 4

In this example, triethylaluminium is added when the polymerization reaction proceeds to a high conversion and influence of the aging period thereafter will be shown.

Into a 1.5 liter autoclave, whose inner atmosphere had been replaced by dry nitrogen gas, there were charged 860 ml. of dry toluene, 0.512 mg.-atom Ni of nickel naphthenate and 3.68 mols of boron trifluoride etherate. The resulting mixture was stirred at 25° C. for 10 minutes. Then, 3.32 mmols of triethylaluminium were added thereto and the resulting mixture was further stirred at 25° C. for 10 minutes. Next, 124 grams of 1,3-butadiene were charged in the autoclave and a polymerization reaction was initiated at 40° C. After 2 hours and 20 minutes (conversion 95%), about ⅓ of the reaction mixture was taken out under a pressure of nitrogen. To the remaining 5 mmols of triethylaluminium were added and the reaction was continued at 40° C. One hour and 20 minutes after addition of triethylaluminium, a half of the reaction mixture was taken out and the remaining reaction mixture was further stirred for 1 hour and the reaction was stopped by an isopropyl alcohol containing an antioxidant. The reaction mixtures taken out halfway and the final reaction mixture were treated to recover the polymer produced as in Example 1. The results are shown in Table 4.

TABLE 4

| Exp. No. | Reaction period after addition of Al(C$_2$H$_5$)$_3$ (hr.) | Mooney viscosity | [$\eta$] | Cold, flow, mg./min. | Gel, percent | Cis-1,4, percent |
|---|---|---|---|---|---|---|
| 15 | 0 | 26 | 2.6 | 2.8 | 0 | 96 |
|  | 1.33 | 29 | 2.6 | 1.1 | 0 | 96 |
|  | 2.33 | 30 | 2.5 | 0.6 | 0 | 96 |

EXAMPLE 5

Butadiene was polymerized with the same method as in Example 1 except that diethylaluminium ethoxide was used instead of triethylaluminium as a Mooney viscosity jump agent. The results are shown in Table 5.

TABLE 5

| Exp. No.: | (C$_2$H$_5$)$_2$Al.OC$_2$H$_5$, mmol | Conversion, percent | Mooney viscosity | [$\eta$] | Cold flow, mg./min. | Gel, percent | Cis-1,4, percent |
|---|---|---|---|---|---|---|---|
| 16 | 0 | 86 | 38.5 | 3.1 | 4.6 | 0 | 96 |
| 17 | 1.6 | 80 | 46.0 | 3.1 | 3.8 | 0 | 96 |
| 18 | 2.4 | 82 | 49.5 | 3.2 | 3.1 | 0 | 96 |
| 19 | 4.0 | 81 | 51.5 | 3.1 | 3.0 | 0 | 96 |
| 20 | 6.4 | 78 | 51.0 | 2.9 | 3.0 | 0 | 96 |

EXAMPLE 6

Butadiene was polymerized with the same method as in Example 1 except that 0.0384 mg.-atom Ni of nickel naphthenate, 2.22 mmols of boron trifluoride etherate and 1.00 mmol of triethylaluminium were used, and that diethylzinc was used instead of triethylaluminium as a Mooney viscosity jump agent in amounts shown in Table 6. The results are shown in Table 6.

TABLE 6

| Exp. No. | Zn(C$_2$H$_5$)$_2$, mmol | Conversion, percent | Mooney viscosity | [$\eta$] | Cold flow, mg./min. | Gel, percent | Cis-1,4, percent |
|---|---|---|---|---|---|---|---|
| 21 | 0 | 97 | 40.0 | 2.6 | 3.9 | 0 | 96 |
| 22 | 1.0 | 82 | 45.5 | 2.8 | 3.5 | 0 | 96 |
| 23 | 2.0 | 78 | 51.5 | 2.9 | 3.0 | 0 | 96 |
| 24 | 3.0 | 80 | 53.0 | 3.0 | 3.0 | 0 | 96 |
| 25 | 5.0 | 69 | 57.5 | 3.0 | 3.2 | 0 | 96 |

EXAMPLE 7

Example 6 was repeated using n-butyllithium in amounts shown in Table 7 instead of diethylzinc. The results are shown in Table 7.

TABLE 7

| Exp. No. | n-C$_4$H$_9$Li, mmol | Conversion, percent | Mooney viscosity | ($\eta$) | Cold flow, mg./min. | Gel, percent | Cis-1,4, percent |
|---|---|---|---|---|---|---|---|
| 26 | 0 | 87 | 44.0 | 2.7 | 5.7 | 0 | 96 |
| 27 | 1.0 | 77 | 48.5 | | 5.0 | 0 | 96 |
| 28 | 2.0 | 82 | 48.0 | 2.6 | 4.7 | 0 | 96 |
| 29 | 3.0 | 71 | 50.5 | 3.6 | 4.0 | 0 | 96 |
| 30 | 5.0 | 71 | 52.0 | 2.9 | 3.0 | 0 | 96 |

EXAMPLE 8

In Examples 1 to 7, there are shown the effects of various Mooney viscosity jump agents for polybutadienes prepared by polymerizing butadiene in toluene with a catalyst consisting of nickel naphthenate, boron trifluoride etherate and triethylaluminium. In this example, effects of triethylaluminium for polybutadienes prepared in the presence of catalysts other than the aforementioned combination in solvents other than toluene will be shown.

Polymerization was carried out at 40° C. for a predetermined period in accordance with polymerization recipes and conditions shown in Table 8, and using 30 grams of 1,3-btuadiene and 120 grams of solvents. Then triethylaluminium was added into the reaction mixture in an amount shown in Table 9, and the reaction mixture was maintained at 40° C. for 1.5 hours while stirring. Thereafter polybutadiene produced was recovered as in Example 1. The results are shown in Table 9.

TABLE 8

| Exp. No. | Catalyst system | | | | Polymerization period, hour |
|---|---|---|---|---|---|
| | Compound A, mg.-atom Ni | Component B, mmol | Component C, mmol | Solvent | |
| 31 | Nickel acetylacetone, 0.09 | Boron trifluoride etherate, 1.0 | n-Butyllithium, 1.3 | n-Heptane | 2.5 |
| 32 | do | do | do | do | 2.5 |
| 33 | Nickel naphthenate, 0.12 | Titanium tetrachloride, 1.1 | Triethylaluminium, 0.44 | 2,2,4-trimethylpentane | 2.5 |
| 34 | do | do | do | do | 2.5 |
| 35 | Nickel benzoate, 0.12 | Vanadiumoxy chloride, 1.5 | Triethylaluminium, 0.50 | n-Heptane | 1.5 |
| 36 | do | do | do | do | 1.5 |
| 37 | Nickel naphthenate, 0.08 | Boron trifluoride etherate, 0.74 | Diethylzinc, 0.65 | 2,2,4-trimethylpentane | 2.0 |
| 38 | do | do | do | do | 2.0 |

TABLE 9

| Exp. No.: | (C$_2$H$_5$)$_3$ Al, mmol | Conversion, percent | Mooney viscosity | ($\eta$) | Cold flow, mg./min. | Cis-1,4, percent |
|---|---|---|---|---|---|---|
| 31 | 0 | 81 | 28 | 2.3 | 6.8 | 95 |
| 32 | 2.0 | 73 | 35 | 2.2 | 3.4 | 95 |
| 33 | 0 | 76 | 31 | 2.4 | 5.8 | 92 |
| 34 | 2.0 | 70 | 34 | 2.4 | 4.5 | 91 |
| 35 | 0 | 75 | 24 | 2.2 | 9.5 | 88 |
| 36 | 1.5 | 70 | 28 | 2.0 | 6.4 | 86 |
| 37 | 0 | 91 | 29 | 2.4 | 5.7 | 96 |
| 38 | 2.0 | 80 | 33 | 2.5 | 2.6 | 96 |

EXAMPLE 9

Butadiene was polymerized according to the following recipe.

Recipe:
| | |
|---|---:|
| 1,3-butadiene (g.) | 28 |
| Toluene (g.) | 168 |
| Nickel naphthenate (mg.-atom Ni) | 0.030 |
| Boron trifluoride etherate (mmol) | 1.648 |
| Triethylaluminium (mol) | 0.779 |
| 1,3-butadiene (mmol) [1] | 0.019 |
| Reaction temperature (° C.) | 40 |
| Reaction period (hr.) | 2.5 |

[1] Present upon preparing the catalyst.

Into a 300 ml. pressure-resistant glass reaction bottle whose inner atmosphere had been replaced by dry nitrogen gas, there were charged dry toluene (containing 0.019 mmol of 1,3-butadiene), nickel naphthenate and boron trifluoride etherate. The resulting mixture was left to stand at room temperature for 10 minutes, and then triethylaluminium was added thereto. The resulting mixture was again left to stand at 50° C. for 60 minutes.

Next, butadiene was charged in said bottle. The bottle was placed in a rotary polymerization bath and the polymerization was carried out at 40° C. The reaction bottle was taken out after 2.5 hours. Triethylaluminium in amounts shown in Table 10 dissolved in 10 ml. of toluene was added to the reaction mixture and, the mixture was well shaken. And then the reaction bottle was rotated in a rotary polymerization bath at 80° C. for 1.5 hours. The thus produced polymer was precipitated by isopropyl alcohol containing a 2% 2,6-di-t-butyl-4-methylphenol and recovered.

The Mooney viscosity and gel content of the obtained polymers were measured. The results are shown in Table 10.

TABLE 10

| Exp. No.: | Al(C$_2$H$_5$)$_3$ (mmol) | Conversion, percent | Mooney viscosity | Gel, percent |
|---|---|---|---|---|
| 39 | 0 | 69.7 | 17.5 | 0 |
| 40 | 1.0 | 96.6 | 92.0 | 10.0 |
| 41 | 1.5 | 83.8 | 105.0 | 10.8 |
| 42 | 2.0 | 75.8 | 144.0 | 3.3 |

EXAMPLE 10

Butadiene was polymerized according to the following recipe.

Recipe:
| | |
|---|---:|
| Butadiene (g.) | 30 |
| Toluene (g.) | 180 |
| Nickel naphthenate (mg.-atom Ni) | 0.010 |
| Boron trifluoride etherale (mmol) | 0.72 |
| Triethylaluminium (mmol) | 0.66 |
| Butadiene (mmol) [1] | 0.66 |
| Reaction temperature (° C.) | 40 |
| Reaction period (hr.) | 3 |

[1] Present upon preparing the catalyst.

Into a 300 ml. pressure-resistant glass reaction bottle, whose inner atmosphere had been replaced by dry nitrogen gas, there were charged at room temperature dry toluene (containing 1.43 mmols of butadiene), nickel naphthenate and boron trifluoride etherate. The resulting mixture was left to stand at room temperature for 5 minutes. Triethylaluminium was added to the mixture and then the mixture was aged at 50° C. for 20 minutes.

Then butadiene was added to the mixture. The reaction bottle was placed in a rotary polymerization bath and polymerization was carried out at 40° C. After 3 hours the reaction bottle was taken out. Diisobutylaluminium hydride in amounts shown in Table 11 dissolved in 10 ml. of toluene was added to the reaction mixture. And then the reaction bottle was rotated in the polymerization bath at 40° C. for 1 hour. The thus produced polymer was recovered. The results are shown in Table 11.

TABLE 11

| Exp. No.: | (i-C$_4$H$_9$)$_2$AlH (mmol) | Conversion, percent | Mooney viscosity | Gel, percent |
|---|---|---|---|---|
| 43 | 0 | 92.5 | 39.5 | 0 |
| 44 | 1.30 | 92.5 | 70.0 | 16.8 |
| 45 | 2.60 | 91.2 | 72.0 | 16.5 |

Reference 1

Butadiene was polymerized according to the following recipe.

Recipe:
| | |
|---|---:|
| 1,3-butadiene (g.) | 30 |
| Toluene (g.) | 180 |
| Nickel naphthenate (mg.-atom-Ni) | 0.039 |
| Boron trifluoride etherate (mmols) | 2.24 |
| Triethylaluminium (mmols) | 1.01 |
| Reaction temperature (° C.) | 40 |
| Reaction period (hrs.) | 3 |

Into a 300 ml. pressure-resistant glass bottle whose inner atmosphere had been replaced by dry nitrogen gas, there were charged toluene, nickel naphthenate and boron trifluoride etherate. The contents were left to stand at 25° C. for 10 minutes and triethylaluminium was added thereto and then the contents are again left to stand at 25° C. for 10 minutes. Subsequently, butadiene was added to the reaction bottle, which was then placed in a rotoary polymerization bath. The polymerization was initiated at 40° C.

After 3 hours the reaction bottle was taken out and an equimolar mixture of titanium tetrachloride and thionyl chloride, a known molecular weight jump agent, in amounts shown in Table 12 dissolved in 10 ml. of toluene was added in the reaction bottle. Then the reaction bottle was well shaken and rotated at 40° C. for 1.5 hours the rotary polymerization bath. The thus produced polymer was recovered. The results are shown in Table 12.

TABLE 12

| Exp. No.: | Jump agent (T basis g./100 monomer) | Conversion, percent | Mooney viscosity | Gel, percent |
|---|---|---|---|---|
| 1 | 0 | 68.3 | 71 | 0.86 |
| 2 | 0.96 | 65.7 | 72 | 0.58 |
| 3 | 1.30 | 73.0 | 72.5 | 0.37 |
| 4 | 2.32 | 68.0 | 65.0 | 0.37 |

As will be apparent from the above table, it is understood that a known molecular weight jump agent is ineffective with the catalyst system of this invention.

Reference 2

Butadiene was polymerized according to the following polymerization recipe.

Polymerization recipe:
| | |
|---|---:|
| 1,3-butadiene (g.) | 30 |
| Toluene (g.) | 180 |
| Bis(triphenylphosphine)-cobaltous bromide (mmol) | 0.0167 |
| Aniline (mmols) | 2.22 |
| Earylaluminium sesquichloride (mmol) | 0.04 |
| Reaction temperature (° C.) | 40 |
| Reaction period (hrs.) | 3 |

According to the abovementioned polymerization recipe, butadiene was polymerized at 40° C. for 3 hours. Then triethylaluminium in amounts shown in Table 13 dissolved in 10 ml. of toluene was added to the reaction mixture. And then the mixture was further reacted at 40° C. for 1.5 hours and thereafter the produced polymer was recovered. The results were shown in Table 13.

TABLE 13

| Exp. No.: | Triethyl-aluminium, mmol | Conversion, (percent) | Mooney viscosity | [η] | Gel, (percent) |
|---|---|---|---|---|---|
| 5 | 0 | 90 | 45 | 1.7 | 0.3 |
| 6 | 2.22 | 83 | 38 | 1.6 | 0.4 |
| 7 | 4.44 | 80 | 40 | 1.6 | 0.4 |
| 8 | 8.88 | 83 | 36 | 1.5 | 0.4 |

As will be apparent from the abovementioned table, it is understood that the method of this invention is ineffective with a known cobalt-containing catalyst system.

Reference 3

Polymerization recipe:
Butadiene (g.) _____ 30
Toluene (g.) _____ 180
Titanium tetrachloride (mmol) _____ 0.15
Iodine (mmol) _____ 0.375
Triethylaluminium (mmols) _____ 1.5

According to the above mentioned polymerization recipe, butadiene was polymerized at 5° C. for 2 hours. Then triethylaluminium in amounts shown in Table 14 dissolved in 10 ml. of toluene was added to the reaction mixture. And the mixture was further reacted at 40° C. for 1.5 hours and thus produced polymer was recovered. The results are shown in Table 14.

TABLE 14

| Exp. No.: | Triethyl-aluminium, mmol | Conversion, (percent) | Mooney viscosity | [η] | Gel, (percent) |
|---|---|---|---|---|---|
| 9 | 0 | 97 | 38 | 1.8 | 0 |
| 10 | 4.5 | 85 | 37.5 | 1.9 | 0 |

As will be apparent from the abovementioned table, it is understood that the method of this invention, is ineffective with a known titanium-containing system.

What is claimed is:
1. A process for the polymerization of butadiene which comprises polymerizing butadiene in a hydrocarbon solvent by contacting butadiene with a catalyst system prepared from (A) an organic compound of nickel, (B) at least one compound selected from halides and oxyhalides of the metals of Groups IV–A and V–A of the Periodic Table, boron halides and complex compounds thereof, and (C) at least one compound selected from organometallic compounds of the metals of Groups I, II and III of the Periodic Table whereby converting butadiene to a solid polymer having a high content of cis-1,4- configuration, such process including adding at least one jump agent selected from (1) organometallic compounds of the formula

$$Me(Me')_l(R)_n(R')_m$$

wherein Me and Me' are metals of Groups I, II and III of the Periodic Table, respectively, R is a hydrocarbyl group having 1 to 8 carbon atoms, R' is selected from the group consisting of hydrogen and an alkoxy group having 1 to 8 carbon atoms, $l$ is an integer of 0 to 1, $n$ is an integer of 1 to 6, $m$ is an integer of 0 to 5, and $n+m$ equals to the total of valencies of metals Me and Me' and (2) an alkylene dilithium compound wherein the alkylene group contains from 1 to 8 carbon atoms, said jump agent being added to the polymerization system after conversion of the butadiene reaches at least 70%.

2. The process of claim 1 wherein said jump agent is a trialkylaluminum.
3. The process of claim 2 wherein said trialkylaluminum is triethylaluminum.
4. The process of claim 1 wherein said jump agent is a dialkylaluminum hydride.
5. The process of claim 4 wherein said dialkylaluminum hydride is a diisobutylaluminum hydride.
6. The process of claim 1 wherein said jump agent is a dialkylaluminum alkoxide.
7. The process of claim 6 wherein said dialkylaluminum alkoxide is diethylaluminum ethoxide.
8. The process of claim 1 wherein said jump agent is a dialkylzinc.
9. The process of claim 8 wherein said dialkylzinc is diethylzinc.
10. The process of claim 1 wherein said jump agent is an alkyllithium.
11. The process of claim 10 wherein said alkyllithium is n-butyllithium.
12. The process of claim 1 wherein said jump agent is added in an amount of 1 to 400 mols based on 1 gram-atom Ni of the component (A) of the catalyst of the polymerization system.
13. The process of claim 1 wherein subsequent to the addition of said jump agent the polymerization system is aged at a temperature of 0°–80° C. for a period of 5 minutes to 10 hours.

References Cited

UNITED STATES PATENTS 3,058,963  10/1968  Vandenberg _____ 260—88.2

JOSEPH L. SCHOFER, *Primary Examiner.*

R. A. GAITHER, *Assistant Examiner.*

U.S. Cl. X.R.
260—94.7